United States Patent
Baltzer

(10) Patent No.: US 6,439,392 B1
(45) Date of Patent: *Aug. 27, 2002

(54) VIBRATING SCREEN ASSEMBLY WITH TUBULAR FRAME

(75) Inventor: Terry L. Baltzer, Talala, OK (US)

(73) Assignee: Southwestern Wire Cloth, Inc., Broken Arrow, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 09/420,089

(22) Filed: Oct. 18, 1999

Related U.S. Application Data

(63) Continuation-in-part of application No. 09/317,385, filed on May 24, 1999, now Pat. No. 6,269,954, and a continuation-in-part of application No. 08/922,205, filed on Sep. 2, 1997, now Pat. No. 5,967,336.

(51) Int. Cl.⁷ .................................................. B07B 1/49
(52) U.S. Cl. ........................ 209/405; 209/408; 209/412; 210/314; 210/488
(58) Field of Search ............................... 209/323, 403, 209/405, 408, 409, 412; 210/314, 484, 486, 488

(56) References Cited

U.S. PATENT DOCUMENTS

| | | |
|---|---|---|
| 1,009,069 A | 11/1911 | Hunnicutt |
| 1,147,279 A | 7/1915 | Sweetland |
| 1,886,173 A | 11/1932 | Flint |
| 2,088,313 A | 7/1937 | Wettlaufer ................. 209/403 |
| 2,271,900 A | 2/1942 | Mowbray .................. 209/403 |
| 2,335,084 A | 11/1943 | Rice ............................ 209/408 |
| 2,576,794 A | 11/1951 | Jost et al. .................... 209/405 |
| 2,723,032 A | 11/1955 | Gisler et al. ................ 209/401 |
| 2,870,910 A | 1/1959 | Wehner ....................... 209/396 |
| 2,902,165 A | 9/1959 | Imershein ................... 210/486 |
| 2,959,285 A | 11/1960 | Tonjes et al. ............... 209/319 |
| 2,985,303 A | 5/1961 | Wright ........................ 209/405 |
| 3,012,674 A | 12/1961 | Hoppe ......................... 209/401 |
| 3,508,649 A | 4/1970 | Kahane et al. .............. 209/323 |
| 3,970,549 A | 7/1976 | Ennis et al. ................. 209/341 |
| 4,033,865 A | 7/1977 | Derrick, Jr. ................. 209/275 |
| 4,380,494 A | 4/1983 | Wilson ....................... 209/319 |
| 4,668,394 A | 5/1987 | Badolato et al. ............ 210/314 |
| 4,728,422 A | 3/1988 | Bailey ......................... 210/314 |
| 4,840,728 A | 6/1989 | Connolly et al. ............ 209/405 |
| 5,137,622 A | 8/1992 | Souter ......................... 209/403 |
| 5,199,574 A | 4/1993 | Hollyfield, Jr. et al. ..... 209/315 |
| 5,221,008 A | 6/1993 | Derrick, Jr. et al. ........ 209/268 |
| 5,248,043 A | 9/1993 | Dorn ........................... 209/399 |
| 5,256,291 A | 10/1993 | Cagle ......................... 210/499 |

(List continued on next page.)

FOREIGN PATENT DOCUMENTS

| | | | |
|---|---|---|---|
| EP | 0032436 | 7/1981 | |
| EP | 0169698 | 1/1986 | |
| GB | 2092917 | 8/1982 | |
| GB | 2276572 | 5/1994 | |
| SU | 1235555 | * 6/1986 | ................. 209/405 |

*Primary Examiner*—Tuan N. Nguyen
(74) *Attorney, Agent, or Firm*—Head, Johnson & Kachigian

(57) ABSTRACT

A vibrating screen assembly having a tubular frame. The tubular frame includes a pair of opposed tubular sides and a pair of opposed tubular ends. An upstanding lip extending from each side and extending from each end forms a rim enclosure. A ledge extends inwardly from the opposed sides. A plurality of tubular cross supports and the opposed tubular ends rest on the ledge and are connected to the opposed sides. A perforated plate with a plurality of screen cloths thereon is positioned within the rim enclosure and secured to a planar surface of the frame. One of the ends includes an extending overhang while the other end includes a lower recess so that an overhang from one screen assembly will mate with a recess from another screen assembly to form a liquid tight seal.

13 Claims, 6 Drawing Sheets

U.S. PATENT DOCUMENTS

| | | | |
|---|---|---|---|
| 5,361,476 A | 11/1994 | Leopold | 29/417 |
| 5,385,669 A | 1/1995 | Leone, Sr. | 210/488 |
| 5,392,925 A | 2/1995 | Seyffert | 209/405 |
| 5,417,793 A | 5/1995 | Bakula | 156/308.2 |
| 5,417,859 A | 5/1995 | Bakula | 210/388 |
| 5,538,139 A | 7/1996 | Keller | 209/382 |
| 5,598,931 A * | 2/1997 | Hosogoshi et al. | 209/405 |
| 5,636,749 A | 6/1997 | Wojciechowski | 209/403 |
| 5,690,826 A | 11/1997 | Cravello | 210/384 |
| 5,967,336 A * | 10/1999 | Baltzer et al. | 209/403 |

* cited by examiner

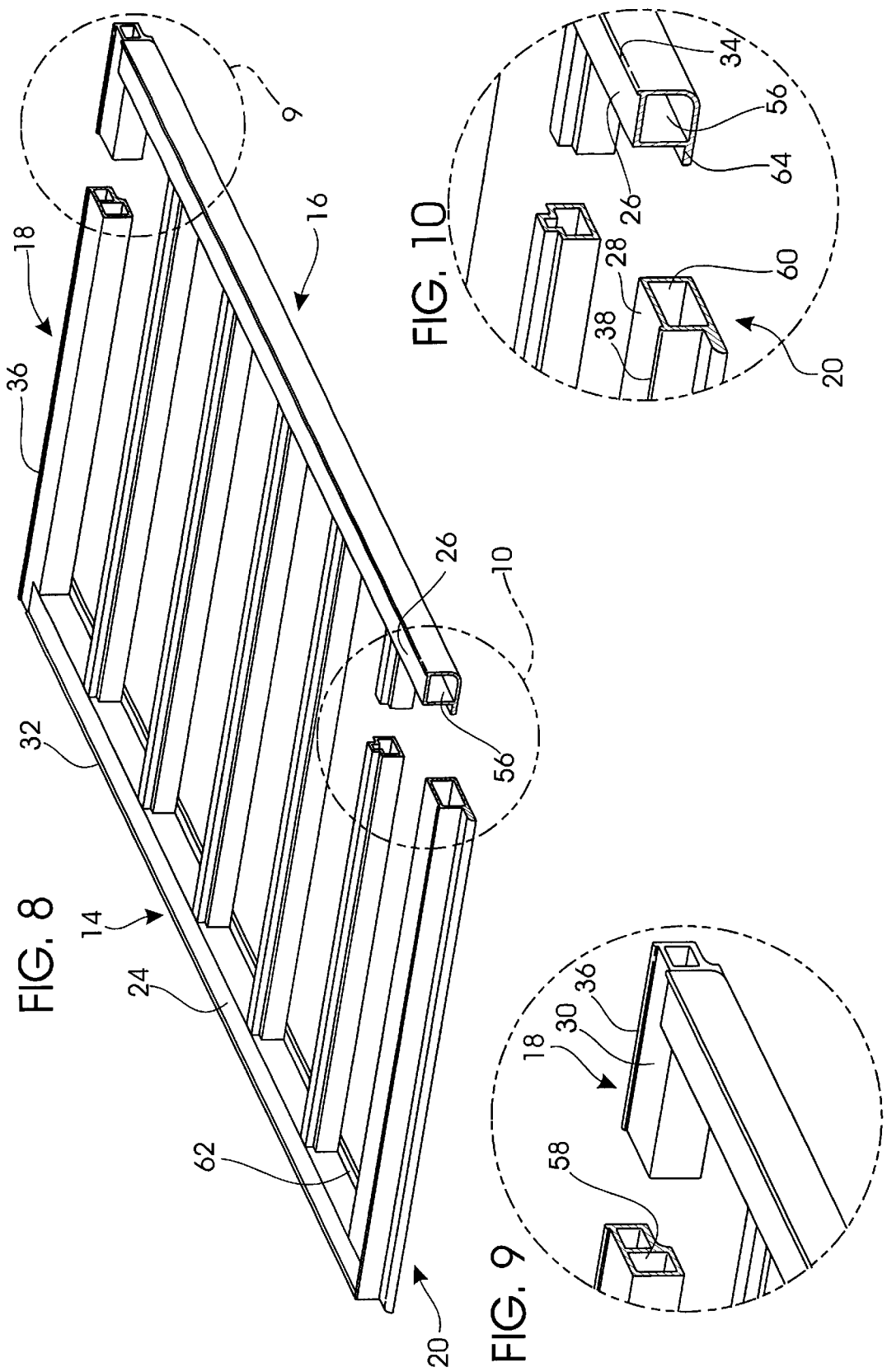

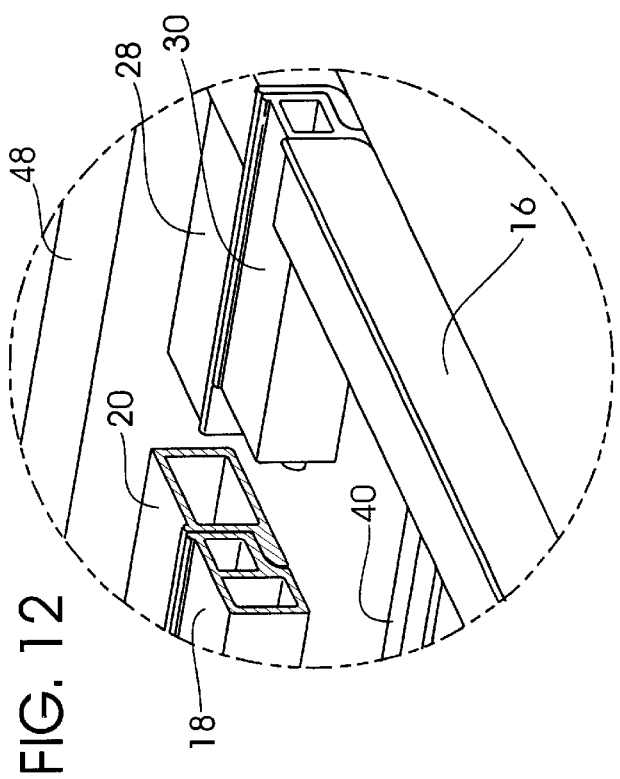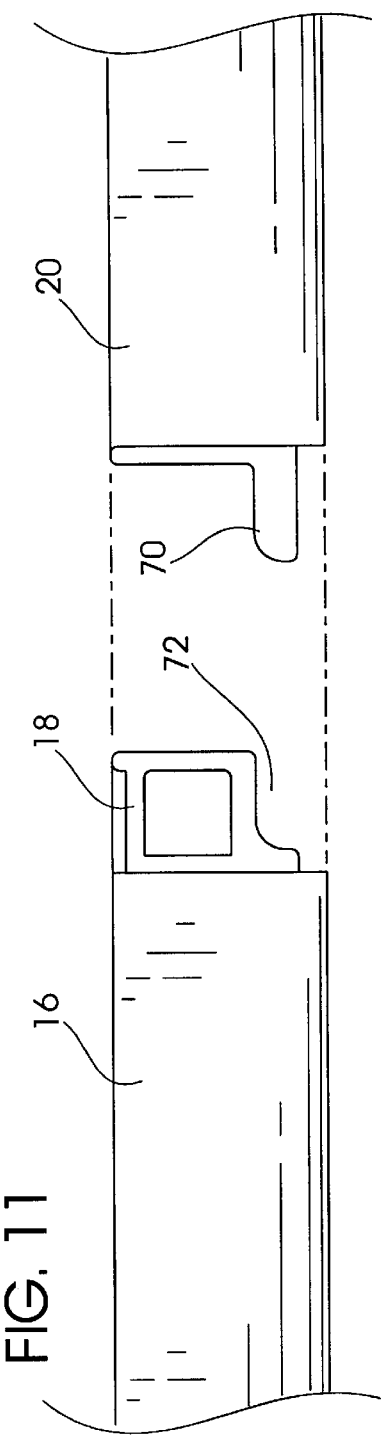

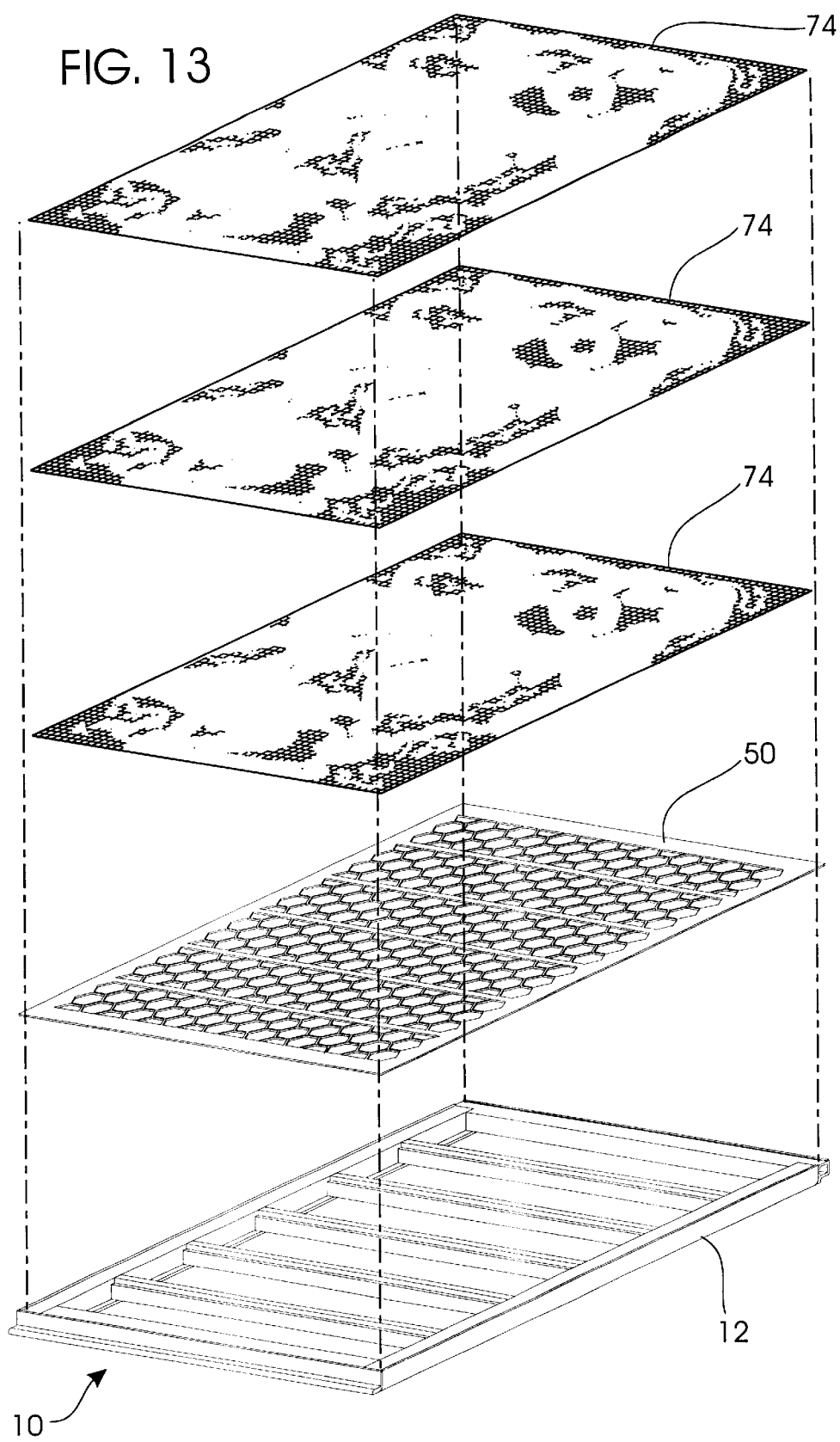

VIBRATING SCREEN ASSEMBLY WITH TUBULAR FRAME

This is a continuation-in-part of Ser. No. 08/922,205 filed Sep. 2, 1997 now U.S. Pat. No. 5,967,336 and of Ser. No. 09/317,385, filed May 24, 1999, now U.S. Pat. No. 6,269,954.

BACKGROUND OF THE INVENTION

1. Field of the Invention

The present invention is directed to a screen assembly for vibrating screen machinery. In particular, the present invention is directed to a vibrating screen assembly for vibrating machinery having a tubular frame, a self alignment mechanism to align a perforated plate and accompanying screens on a frame, and a seal to prevent leakage of fluid between adjoining screen assemblies.

2. Prior Art

Vibrating shakers utilize a screen assembly or a plurality of screen assemblies to separate solid material from liquids and fine solid particles. The screen assembly is typically secured in and to the vibrating machinery through use of a frame. In some cases, a single screen assembly will be utilized while in other cases, a plurality of screen assemblies will be aligned adjacent to each other end-to-end. The screen assembly is removably attached to the vibrating shaker. A mixture of materials is delivered or fed to the top of the screen assembly. The screen assembly is vibrated by a motor at a high frequency.

The force of gravity plus the vibration of the screen assembly separates the liquid from particles larger than the pore size made up by the combination of layers. This pore size is called the "cut point." The screen assembly may be inclined when secured in the vibrating shaker so that the solids larger than the cut point will move across the screen where they are gathered and disposed of. In other arrangements, one screen assembly is oriented in the shaker in angular relation to the other screen assembly. In each case, the liquid and particles smaller than the cut point pass through the screen assembly and are also collected.

Vibrating shaker machines are often used at remote locations, such as oil and gas well drilling sites. Thus, the replacement screen assemblies must be transported great distances to these remote locations. A relatively lightweight screen assembly is therefore desirable.

Since the screen assembly must be transported and then installed in the field, any sharp edges on the screen assembly should be minimized.

There are various types of screen assemblies having various frames. In one configuration, a plurality of screen cloth layers are attached to a perforated plate which is, in turn, connected to the frame. The perforated plate has a large number of small openings to minimize the unsupported spans of screen cloth. It is important to achieve good adhesion between the perforated plate and the frame. Thus, the frame must have an adequate planar surface to attach securely to the perforated plate.

The screen assembly is subject to tremendous stresses caused by the machinery vibrating it. Additionally, the screen assembly is subject to stresses from the weight of the material to be separated on the top layer of the screen. It is known that the screen assemblies will wear from usage and have a certain useful life, often in hours.

In order to balance screen life with through-put, it has been known to secure multiple layers of wire screen cloth to a perforated panel. The perforated panel is, in turn, secured to the frame. In the manufacturing process, the perforated panel and accompanying screens must be accurately aligned before adhesively bonding to the frame. It would be desirable to provide a self-alignment mechanism to align the perforated plate with the frame.

It is a principal object and purpose of the present invention to provide a vibrating screen assembly having a tubular frame which is both lightweight and rigid.

It is a further object and purpose of the present invention to provide a vibrating screen assembly having a frame which would position the perforated panel thereon during the assembly process and discourage separation of the frame from the perforated panel.

It is an additional object and purpose of the present invention to provide a vibrating screen assembly with a blunt, safe edge around the perimeter to prevent property damage and to prevent personnel injury.

It is an additional object and purpose of the present invention to provide a vibrating screen assembly with good adhesion between the frame and the perforated plate.

It is a further object and purpose of the present invention to provide a vibrating screen assembly that will have a maximum useful life while being simple and inexpensive to manufacture.

It is a further object and purpose of the present invention to provide a screen assembly having a strong tubular frame which will provide strength from side to side and provide strength from end to end.

One problem with existing screen assemblies is that they permit a mixture of liquid and solid particles to flow between adjoining screen frames, thereby allowing the liquid to bypass and frustrate the process described herein for separating the mixture into liquid and solid particles.

Accordingly, it is a principal object and purpose of the present invention to prevent a leakage of a mixture of liquid and solid particles between adjoining screen assemblies by providing a seal mechanism.

It is a further object and purpose of the present invention to provide a replaceable screen assembly for a vibrating shaker that is simple and quick to install and to replace.

SUMMARY OF THE INVENTION

The present invention is directed to a vibrating screen assembly having a tubular frame which includes a pair of opposed sides and a pair of opposed ends. The sides are opposed and parallel to each other. Each opposed side of the frame includes a rectangular tubular portion having a top that forms a flat planar surface.

Each side has a flat planar surface and each end has a flat, planar surface which are aligned with each other in the assembled frame. An upstanding lip extends vertically from each of the planar surfaces, the lips together defining an area forming a rim enclosure.

Finally, a ledge extends from each side parallel to the planar surfaces inwardly. The ledges are opposed to and facing each other.

The frame also includes a plurality of tubular cross supports which extend between the sides and are parallel to the ends. The tubular cross supports and the ends rest on and are attached to the ledges.

A perforated plate is attached and secured to the frame in the assembled condition. The perforated plate includes a plurality of openings which are punched or otherwise formed in the plate.

The frame is adhesively secured to the perforated plate. The plate and a plurality of accompanying screen cloths are aligned on the frame by the lips which form the rim enclosure. Each of the lips is rounded or radiused at its top to help align and guide the plate during installation.

In order to produce a vibrating screen assembly in accordance with the present invention, the sides of the frame are extruded in lengths, such as from extruded aluminum. The ends may also be fabricated from extruded aluminum. The frame sections are cut to desired lengths to form the pair of opposed sides. The ends are each notched where they are joined to the sides.

Likewise, lengths of tubular support are extruded, such as from extruded aluminum. Tubular support members are cut from these lengths to the desired dimension. The opposed sides, opposed ends, and tubular cross supports are clamped together and then welded. The joints between the cross supports and the sides of the frame and the ends and the sides of the frame are strengthened since the cross supports and ends rest on the ledges.

The perforated plate is fabricated with hexagonal or other openings and, thereafter, coated with epoxy. Both heat and pressure are used to bond the multiple screen mesh layers to the perforated plate. Accordingly, the perforated plate and the screen cloths are secured together. Thereafter, the perforated plate and the accompanying screen cloths are secured to the frame by glue or other adhesive or mechanical methods. The lips form a rim enclosure that aligns and guides the perforated plate and accompanying screen cloths on the frame. The plate is prevented from moving from side to side or end to end with respect to the frame because of the rim enclosure. The lip also provides a blunt, safe edge around the perimeter of the screen assembly which keeps personnel from cutting their hands.

Additionally, a seal mechanism is provided to seal adjoining screen assemblies. One frame end has a protruding overhang while the opposed end on an adjacent screen frame has a recess. The protruding overhang has a radiused end while the recess is likewise radiused. The protruding overhang of one frame will mate with the recess of the other frame to form a liquid-tight seal.

BRIEF DESCRIPTION OF THE DRAWINGS

FIG. 8 is a perspective view of the frame of the present invention shown in FIG. 1 with portions cut away in two areas;

FIGS. 9 and 10 are enlarged views of the cut-away portions in FIG. 8;

FIG. 11 illustrates two screen assemblies in end-to-end alignment; and

FIG. 12 is a partial, perspective view of two screen assemblies engaged to form a liquid tight seal with portions cut-away for clarity.

FIG. 13 is an exploded view of as screen assembly constructed in accordance with the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

Figure 1:
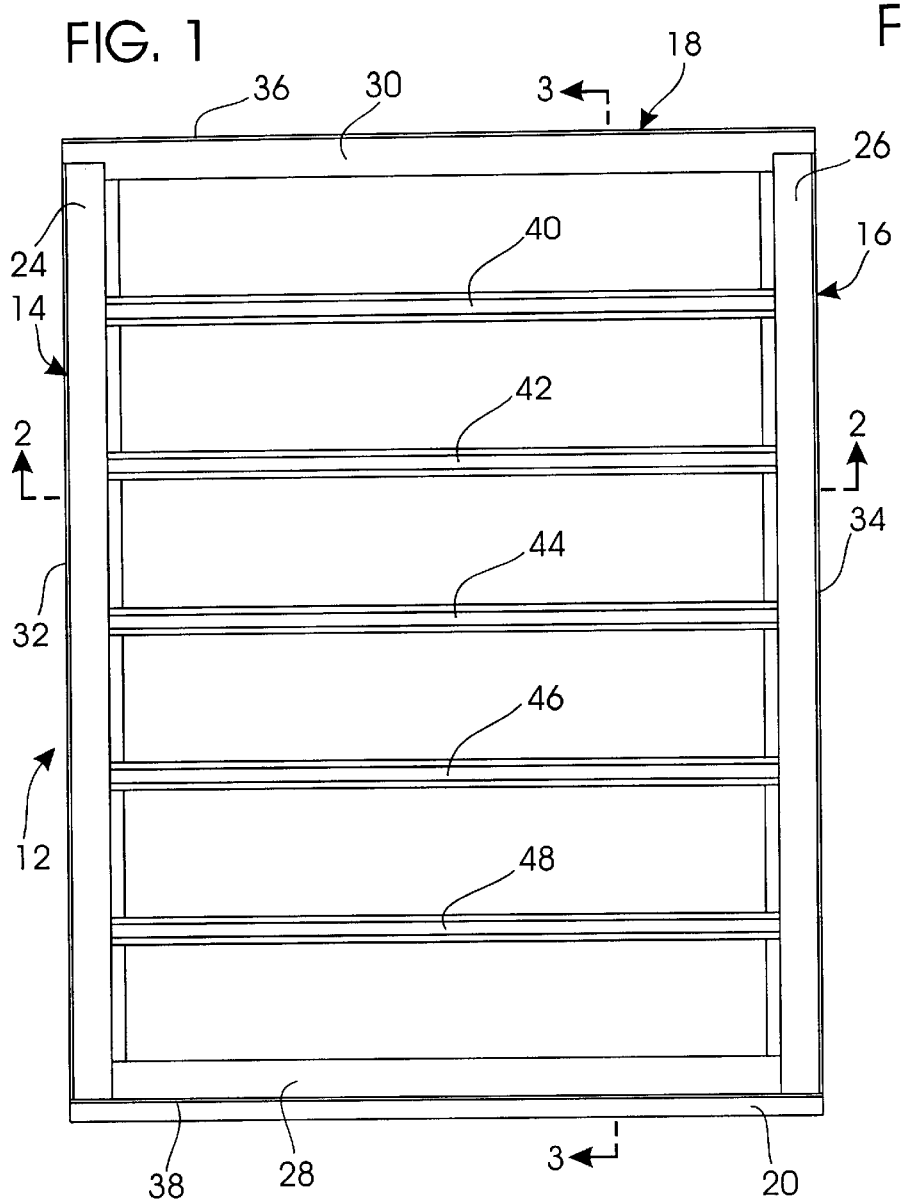
FIG. 1 is a top view of a frame which is an element of a vibrating screen assembly constructed in accordance with the present invention.
Figure 3:
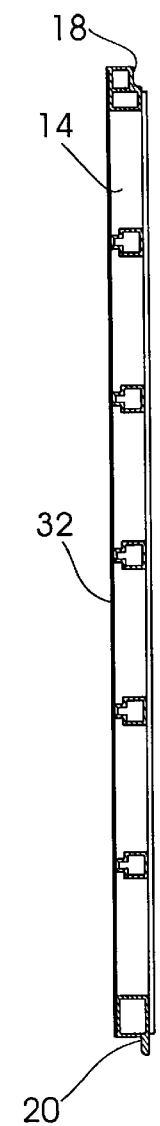
FIG. 3 is a sectional view of the frame taken along section line 3—3 of FIG. 1.
Figure 2:
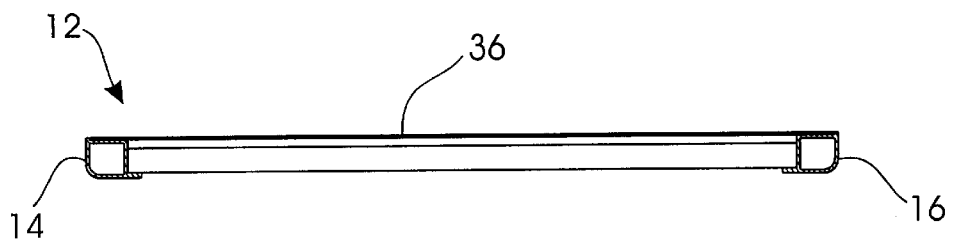
FIG. 2 is a sectional view of the frame taken along section line 2—2 of FIG. 1.

Referring to the drawings in detail, FIG. 1 illustrates a top view of a frame 12 which is an element of a vibrating screen assembly 10 (only the frame 12 seen in FIG. 1) constructed in accordance with the present invention. FIG. 2 illustrates a sectional view of the frame 12 taken along section line 2—2 of FIG. 1 and FIG. 3 illustrates a sectional view of the frame taken along section line 3—3 of FIG. 1.

The frame 12 includes a pair of opposed sides 14 and 16 and a pair of opposed ends 18 and 20. The sides 14 and 16 are opposed and parallel to each other. Likewise, the ends 18 and 20 are opposed and parallel to each other. The sides may be composed of the same pieces which may be cut to size from extruded lengths. In a preferred embodiment, the sides 14 and 16 and the ends 18 and 20 are composed of extruded aluminum material. As best seen in FIG. 2, the bottom edges of the sides 14 and 16 are slightly rounded to facilitate installation of the screen assembly.

Each side 14 and 16 has a flat, planar surface 24 and 26, respectively. Likewise, each end 18 and 20 has a flat, planar surface 28 and 30, respectively. The flat planar surfaces 24, 26, 28 and 30 are aligned with each other in the assembled frame 12 to form a continuous flat planar surface.

Side 14 includes an upstanding lip 32 extending vertically from the planar surface 24. Side 16 includes an upstanding lip 34 extending vertically from the planar surface 26. The end 18 includes an upstanding lip 36 extending vertically from the planar surface 30. The end 20 includes an upstanding lip 38 extending vertically from the planar surface 28. The lips 32, 34, 36 and 38 together define an area forming a rim enclosure.

The frame 12 also includes a plurality of tubular cross supports 40, 42, 44, 46 and 48. It will be appreciated that a greater or lesser number of tubular supports might be employed within the teachings of the present invention. Each of the tubular supports extend between the sides 14 and 16 and are parallel to ends 18 and 20. The tubular supports in the present embodiment have a base which is rectangular in cross-section and a narrower top although other configurations are possible within the scope of the invention.

It has been found that the frame 12 provides superior strength both from side to side and from end to end.

Figure 4:
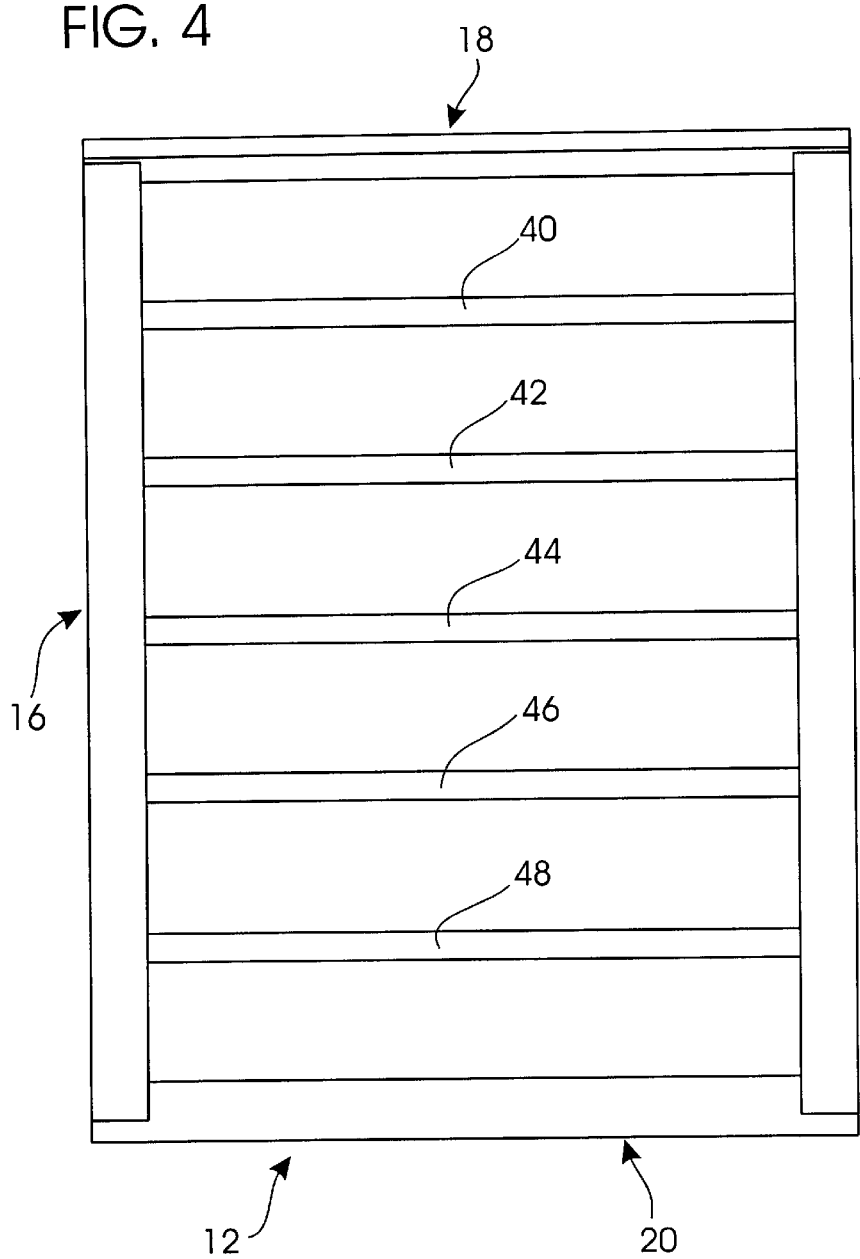
FIG. 4 is a bottom view of the frame shown in FIG. 1.
Figure 6:
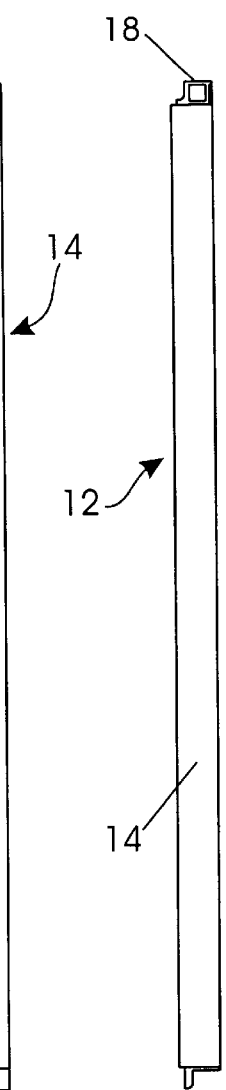
FIG. 6 is a side view of the frame shown in FIG. 4.
Figure 5:
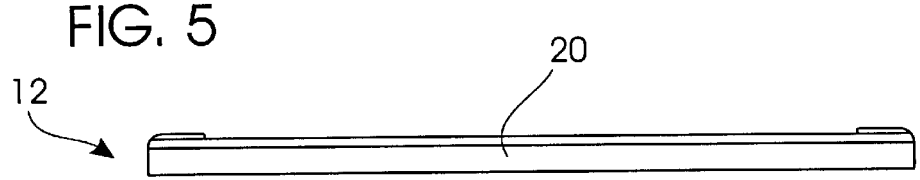
FIG. 5 is an end view of the frame shown in FIG. 4.

FIG. 4 illustrates a bottom view of the frame 12 shown in FIGS. 1 through 3 while FIG. 5 shows an end view and FIG. 6 shows a side view of the frame 12.

Figure 7:
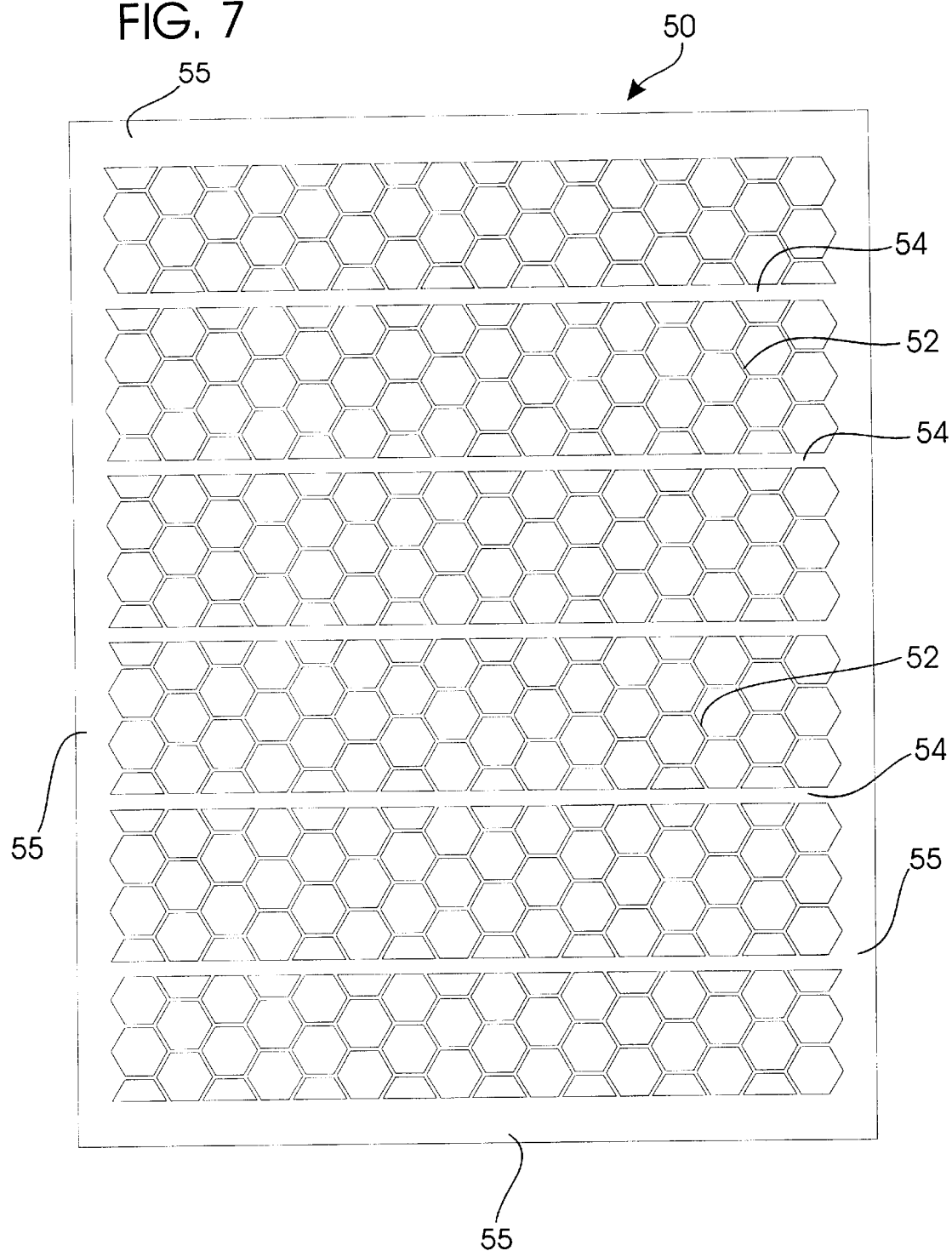
FIG. 7 is a top view of a perforated plate which is an element of the vibrating screen assembly of the present invention.

FIG. 7 illustrates a top view of a perforated plate 50. As will be seen, the perforated plate 50 is attached to and secured to the frame 12 in the assembled condition. In a preferred embodiment, the perforated plate is fabricated from metal but other materials are possible. The perforated plate 50 includes a plurality of hexagonal openings 52 which are punched or otherwise formed in the plate. The perforated plate may also include unperforated areas 54 which will align with the tubular supports. The perforated plate also includes a border area 55 which will align with the planar surfaces of the frame 12, providing an area for good adhesion between the frame and the plate.

FIG. 8 illustrates a perspective view of the frame 12 with portions cut away. FIGS. 9 and 10 shows portions cut-away in FIG. 8 enlarged.

Each opposed side 14 and 16 includes a rectangular tubular portion 56. A top of the rectangular tubular portion 56 forms the planar surface 26. Side walls of the tubular portion 56 are perpendicular to the planar surface 26. Likewise, a top of the tubular portion of the side 14 forms the planar surface 24. Side walls of the tubular portion are parallel to planar surface 24.

The end 18 includes a rectangular tubular portion 58 wherein a top of the tubular portion forms a planar surface 30. The end 20 includes a rectangular tubular portion 60 wherein a top of the tubular portion forms planar surface 28. With the sides and ends fabricated from hollow tubes, a lightweight yet rigid frame is provided.

Finally, a ledge 62 and 64 extends parallel to each of the planar surfaces. Ledge 62 extends inwardly from side 14. Likewise, ledge 64 extends inwardly from side 16. The ledges 62 and 64 are aligned with, opposed to and face each other. The tubular cross supports 40, 42, 44, 46 and 48 each extend between the frame sides 14 and 16.

The tubular cross supports rest on and are connected to both ledges 62 and 64. The ledges 62 and 64 facilitate welding of each of the cross supports to the sides. Once assembled, the top of the tubular cross supports are aligned with the planar surface.

As best seen in FIGS. 1, 8 and 9, the end 18 is notched where it is joined with sides 14 and 16. As best seen in FIGS. 4 and 8, the end 20 is notched where it is joined with the sides 14 and 16. As best seen in FIGS. 4 and 8, the end 20 is notched where it is joined with sides 14 and 16.

FIGS. 11 and 12 illustrate the seal mechanism to seal adjoining screen assemblies for vibrating machinery. Where a plurality of screen assemblies are utilized in a vibrating machine, they will often be aligned adjacent with each other end-to-end. As seen in the exploded view in FIG. 11, the end 20 includes a protruding overhang 70. The overhang is parallel to the planar surface. On an adjoining screen assembly, the end 18 includes a lower recess 72. The extending overhang 70 will fit within and mate with the recess 72 in order to form a liquid tight seal. The dashed lines show the direction of movement to engage the screen assemblies. FIG. 12 shows the frames (with the perforated plates and screens removed for easy visibility) in engaged position.

FIG. 13 is an exploded view of the screen assembly 10. The frame 12 is adhesively secured to the perforated plate 50 with adhesive. The plate 50 and the accompanying screen cloths are aligned on the frame by the lips which form a rim enclosure.

The process for producing a vibrating screen assembly 10 of the present invention includes a number of steps. Initially, the sides 14 and 16 of the frame 12 are extruded in lengths, such as from extruded aluminum. The end 18 and end 20 may also be of extruded aluminum. These frame sections are then cut to desired lengths to form a pair of opposed sides 14 and 16 and a pair of ends 18 and 20.

Likewise, lengths of tubular support are extruded, such as from extruded aluminum. The tubular support members 40, 42, 44, 46 and 48 are cut from these lengths to the desired dimensions. The opposed sides and opposed ends are clamped together and then tack welded. Thereafter, the entire frame 12, including the cross supports, is welded together. As previously described, the tubular cross supports rest on the ledges. The connecting weld points may require some minor surface grinding for a smooth finish.

Prior to connecting the perforated plate 50 and accompanying screen cloths 74, the frame 12 may be cleaned with acetone or other cleaner.

The perforated plate 50 is fabricated with hexagonal or other openings and, thereafter, coated with epoxy. Both heat and pressure are used to bond the screen mesh layers to the plate 50. In the present embodiment, three layers of screen mesh are utilized although a greater or lesser number may be used. Accordingly, the perforated plate and the screen cloths are secured together.

If rough edges of screen mesh 74 extend from the edges of the perforated plate, these may be sheared off. Unlike in the past, it is unnecessary to grind the edges, since the combined plate 52 and screen layers 53 will be received within the rim enclosure of the frame 12.

The lips which form the rim enclosure form a blunt, safe edge around the perimeter of the screen assembly 12 for safe handling.

The perforated plate 50 and the accompanying screen cloths 74 are, thereafter, secured to the frame 12. In a preferred embodiment, a bead of glue or other adhesive is placed on the planar surfaces 24, 26, 28 and 30 of the frame 12. Adhesive may also be applied to the cross supports. In one embodiment, an acrylic adhesive such as methyl methacrylate is used. Each of the lips is rounded or radiused at its top to help align the plate during installation. The lips form a rim enclosure that align the perforated plate on the frame. Once the adhesive has cured, a secure bond is formed.

In usage on vibrating screen machinery, the perforated plate is prevented from moving side to side or end to end with respect to the frame because of the rim enclosure.

The joints between the cross supports and the sides and the joints between the ends and the sides of the frame are strengthened since the cross supports 40, 42, 44, 46 and 48 and ends 18 and 20 rest on the ledges. Accordingly, only an upward force would act to separate the cross supports 40, 42, 44, 46 and 48 from the sides or the ends and the sides.

Whereas, the present invention has been described in relation to the drawings attached hereto, it should be understood that other and further modifications, apart from those shown or suggested herein, may be made within the spirit and scope of this invention.

What is claimed is:

1. A vibrating screen assembly which comprises:
   a frame having a pair of opposed tubular sides and a pair of opposed tubular ends, each side and each end having a planar surface;
   a lip extending vertically from said planar surfaces to form a rim enclosure;
   one said end having an extending overhang and another said end having a recess to mate with said overhang to form a liquid tight seal; and
   a plurality of screen cloths supported on and secured to said frame.

2. A vibrating screen assembly which comprises:
   a frame having a pair of opposed tubular sides and a pair of opposed tubular ends, each said side and each said end having a planar surface;
   an upstanding lip extending vertically from each said planar surface to form a rim enclosure;
   a ledge extending inwardly from said opposed sides;
   a plurality of tubular cross supports resting on said ledges and connecting said sides; and
   a plurality of screen cloths supported on said frame and positioned thereon by said rim enclosure wherein said screen cloths are secured to and integral with said frame.

3. A vibrating screen assembly as set forth in claim 2 wherein said screen cloths are bonded to a perforated plate and wherein said perforated plate rests on said frame and is positioned thereon by said rim enclosure.

4. A vibrating screen assembly as set forth in claim 2 wherein one said tubular end includes an extending overhang and another said tubular end includes a lower recess to mate with an overhang of another assembly to form a liquid tight seal.

5. A vibrating screen assembly as set forth in claim 2 wherein said tubular cross supports are welded to said opposed tubular sides.

6. A vibrating screen assembly as set forth in claim 2 wherein each end rests on said ledges.

7. A vibrating screen assembly as set forth in claim 2 wherein said sides are cut to size from extruded lengths.

8. A vibrating screen assembly as set forth in claim 3 wherein said screen cloths are bonded to said perforated plate by heat and pressure.

9. A vibrating screen assembly as set forth in claim 3 wherein said perforated plate and said screen cloths are secured to said frame by adhesive.

10. A vibrating screen assembly as set forth in claim 3 wherein said perforated plate is mechanically fastened to said frame.

11. A vibrating screen assembly which comprises:
 a continuous frame of a pair of side tubes and a pair of end tubes, each said tube having a planar surface;
 a lip extending vertically from said planar surface to form a rim enclosure;
 a ledge extending inwardly from said side tubes;
 a plurality of tubular cross supports resting on said ledge; and
 a perforated plate with a plurality of screen cloths thereon positioned within said rim enclosure and secured to and integral with said planar surfaces.

12. A vibrating screen assembly as set forth in claim 11 wherein said side tubes and said end tubes are each extruded and cut in lengths to form said sides and ends.

13. A vibrating screen assembly as set forth in claim 11 wherein each said side tube has a side wall perpendicular to said planar surface, wherein said ledge extends perpendicularly from said side wall.

* * * * *